United States Patent
Yuhn

[19]
[11] Patent Number: 6,052,440
[45] Date of Patent: Apr. 18, 2000

[54] SYSTEM AND METHOD OF DELIVERING A MULTIMEDIA ALARM CALL MESSAGE

[75] Inventor: Melody Carol Yuhn, Plano, Tex.

[73] Assignee: Samsung Electronics Co., Ltd., Suwon, Rep. of Korea

[21] Appl. No.: 09/181,655

[22] Filed: Oct. 29, 1998

[51] Int. Cl.[7] .................................................. H04M 3/432
[52] U.S. Cl. .................................. 379/88.13; 379/88.23; 379/88.25
[58] Field of Search .................................. 379/51, 88.13, 379/88.22, 88.25, 88.27, 93.01, 93.17, 93.23, 230, 88.23

[56] References Cited

U.S. PATENT DOCUMENTS

| | | | |
|---|---|---|---|
| 5,008,926 | 4/1991 | Misholi | 379/88.13 |
| 5,208,850 | 5/1993 | Kino | 379/88.13 |
| 5,333,173 | 7/1994 | Seazholtz et al. | 379/45 |
| 5,473,680 | 12/1995 | Porter | 379/201 |
| 5,479,411 | 12/1995 | Klein | 379/88.13 |
| 5,497,373 | 3/1996 | Hulen et al. | 370/259 |
| 5,530,740 | 6/1996 | Irribarren et al. | 379/88.17 |
| 5,548,789 | 8/1996 | Nakanura | 395/200.36 |
| 5,557,659 | 9/1996 | Hyde-Thomson | 379/88.13 |
| 5,625,404 | 4/1997 | Grady et al. | 348/7 |
| 5,630,060 | 5/1997 | Tang et al. | 395/200.68 |
| 5,646,982 | 7/1997 | Hogan et al. | 379/88.22 |
| 5,742,668 | 4/1998 | Pepe et al. | 455/415 |
| 5,751,791 | 5/1998 | Chen et al. | 379/88.13 |
| 5,760,823 | 6/1998 | Brunson et al. | 348/14 |
| 5,778,052 | 7/1998 | Rubin et al. | 379/88.25 |
| 5,781,614 | 7/1998 | Brunson | 379/88.14 |
| 5,822,404 | 10/1998 | Cave | 370/468 |
| 5,859,898 | 1/1999 | Checco | 379/88.01 |
| 5,864,614 | 1/1999 | Farris et al. | 379/207 |
| 5,870,454 | 2/1999 | Dahlen | 379/88.14 |
| 5,889,848 | 3/1999 | Cookson | 379/230 |

OTHER PUBLICATIONS

George McDaniel, IBM Dictionary Of Computing, Data Unknown, McGraw–Hill, Inc., p. 444.

Alan Freedman, The Computer Desktop Encyclopedia, Amacom, Date Unknown, p. 561.

Richard C. Dorf, The Electrical Engineering Handbook, 2nd Ed., CRC Press, Date Unknown, p. 2197.

Harry Newton, Newton's Telecom Dictionary, 14th Ed., Flatiron Publ., ISBN 1–57820–023–7, pp. 261 & 470, Mar. 1998.

*Primary Examiner*—Krista Zele
*Assistant Examiner*—Roland G. Foster
*Attorney, Agent, or Firm*—Jones Volentine, L.L.P.

[57] ABSTRACT

A telephony system schedules and delivers multimedia Alarm Call messages to users via multimedia end user terminals connected with the system over a multimedia bearer connection. A user may select one of a plurality of predefined messages to be delivered either once or periodically according to a user-defined schedule. The system may also allow users to create and schedule delivery of custom multimedia Alarm Call messages.

26 Claims, 3 Drawing Sheets

SYSTEM AND METHOD OF DELIVERING A MULTIMEDIA ALARM CALL MESSAGE

BACKGROUND OF THE INVENTION

1) Field of the Invention

This invention pertains to the field of telecommunication systems and, more particularly, to an improved system and method of delivering scheduled messages or announcements to a telecommunication user of an Alarm Call service.

2) Description of the Related Art

Telecommunication systems are constantly being enhanced and improved to provide increased functionality and flexibility for end users. One feature that has been available on some telephony systems is an Alarm Call service. In such an Alarm Call service, the telephony system delivers an Alarm Call message, consisting of a pre-defined alert or announcement(e.g., Wake-up, Happy Birthday, etc.), to a user at a prescheduled time. One popular example is a wake-up call wherein a user's telephone rings at a predetermined time, which was earlier scheduled by the user, to wake-up the user.

Unfortunately, these existing Alarm Call services are limited and inflexible. For example, the messages are limited to narrowband voice messages, or even just ringing the telephone handset, delivered over a narrowband telephony network to telephone handsets. The user may not receive messages which integrate data, voice and multimedia video, for example. Also, the user may not receive Alarm Calls on a computer screen, for example, or over a broadband bearer channel such as an Integrated Services Digital Network (ISDN) line, broadband ISDN (B-ISDN), packet data, frame relay, Asynchronous Digital Subscriber Line (ADSL) connection, or a broadband cable modem.

Moreover, users are limited to control procedures which can easily be entered by a Dual Tone Multi-Frequency (DTMF) keypad. Accordingly, a limited set of predefined control keystroke sequences are available to a user who may not be able to create a customized Alarm Call message.

Other limitations exist. Calls must be requested within a 24 hour period and will not automatically repeat after 24 hours, i.e., the user must request another Alarm Call the next day for the same time if such is desired. A user is allowed only one outstanding Alarm Call within the next 24 hour period. If a new or different Alarm Call is desired, then the user must first cancel the existing call and then schedule the new, desired call.

Accordingly, it would be advantageous to provide a system and method of delivering enhanced multimedia-type Alarm Calls to telecommunication users. It would also be advantageous to provide a system and method of delivering such Alarm Calls over wide bandwidth, multimedia bearer telecommunication connections. It would further be advantageous to provide an Alarm Call service which provides the user with more control procedures and flexibility than available in the prior art. Other and further objects and advantages will appear hereinafter.

SUMMARY OF THE INVENTION

The present invention comprises a system and method of providing a multimedia Alarm Call service in a telecommunication system.

In one aspect of the invention, an Alarm Call service provides multimedia messages or announcements to users. A multimedia message or announcement may include audio, video, voice, or data signaling or information or combinations of said media. Preferably, the user may have an option to create and store a custom message, in addition to selecting from a group of predefined and stored messages.

In another aspect of the invention, Alarm Call messages are provided over a variety of connection-oriented and connectionless bearer services. The Alarm Call service may deliver messages over broadband media including but not limited to ISDN, frame relay service, ADSL or cable modems.

In still another aspect of the invention, Alarm Call messages may be delivered to a variety of user terminal equipment types. Terminal equipment types may include telephony handsets, videophone terminals, multimedia conferencing equipment, computer terminals, laptop computers, etc.

In yet another aspect of the invention, an Alarm Call service provides a user with multimedia control procedures for scheduling an Alarm Call message. The control procedures can provide more flexibility for a user to schedule the time and location where messages or announcements are to be delivered. Since the control procedures are multimedia, they may be performed via equipment such as computer terminals, video devices etc. and the user is not limited to a DTMF telephone keypad. The multimedia control procedures can also permit a user to create or select a multimedia Alarm Call message or announcement.

In yet a further aspect of the present invention, a multimedia Alarm Call service is compatible with protocols for Intelligent Networks including Advanced Intelligent Networks.

DESCRIPTION OF THE PREFERRED EMBODIMENTS

Figure 1:
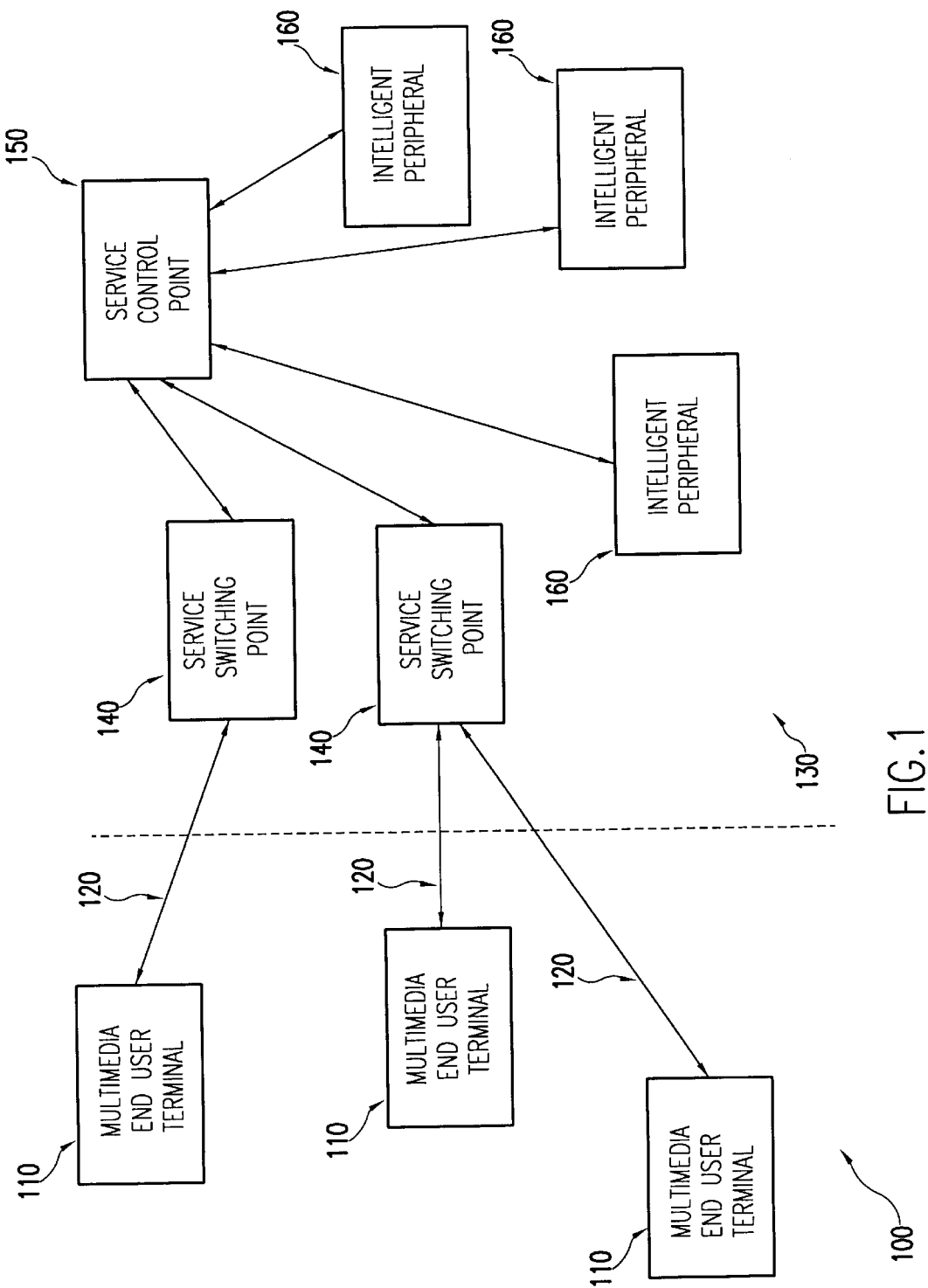
FIG. 1 is a high-level block diagram of a system for delivering an Alarm Call message according to one or more aspects of the present invention.

A high level block diagram of a preferred embodiment of an Alarm Call delivery system 100 is shown in FIG. 1. One or more multimedia end user terminals 110 is connected over one or more multimedia bearer connection(s) 120 with a network provider equipment system 130. The system may operate with a number of different types of multimedia bearer connections 120. In a preferred embodiment, the multimedia bearer connection 120 provides a broadband service such as an ISDN, frame relay, ADSL or cable modems. Also, the multimedia bearer connection 120 may comprise a telephony connection via the Internet.

The multimedia end user terminal 110 may be a dedicated device, such as a videophone or computer terminal. Alternatively, a user may connect a portable communication device, laptop computer with modem, or similar device to the multimedia bearer connection 120 as the multimedia end user terminal 110. The multimedia end user terminal 110 may include a microprocessor for executing one or more software programs for establishing a connection with and communicating the network provider equipment system 130, such as a connection using transmission- controlprotocol/Internet-protocol (TCP/IP). The multimedia end user terminal 110 may also include local storage media for storing a multimedia message for delivery from or to the network provider equipment system 130. The multimedia end user terminal 110 may further include a speaker and/or a video display device for playing audio or audiovisual messages to a user. In general, the multimedia end user terminal 110 is equipped to deliver whatever type or types of multimedia message is communicated to it.

The network provider equipment system 130 may be located on an end user's premises, but more typically is located at premises of a local telephony network provider. The network provider equipment system 130 is typically connected with a number of multimedia end user terminals 110 which may be located at several different remotely located premises or, for example, within one or more corporate office complexes. In as preferred embodiment, the network provider equipment system 130 is compatible with standards for an Advanced Intelligent Network (AIN).

The network provider equipment system includes a connected switch for connecting with a multimedia end user terminal, a centralized database, and one or more data recording device. In the preferred embodiment of FIG. 1, the connected switch is a Service Switching Point 140, the centralized database is a Service Control Point 150, and the data recording devices are Intelligent Peripherals 160. The Service Switching Point 140 receives and initiates calls to one or more multimedia end user terminals 110 over multimedia bearer connection(s) 120. In a preferred embodiment, the Service Switching Point 140 detects a user's selection of a feature of the network provider equipment, including a request for an Alarm Call message.

In a preferred embodiment, upon detecting a request for a feature, the Service Switching Point 140 sends a message to the Service Control Point 150 which manages the delivery of various features to an end user. The Service Control Point 150 communicates with the Service Switching Point 140 and one or more Intelligent Peripherals 160 to establish a connection between the user and an Intelligent Peripheral 160. In a preferred embodiment, standard IN messaging is used.

Figure 2:
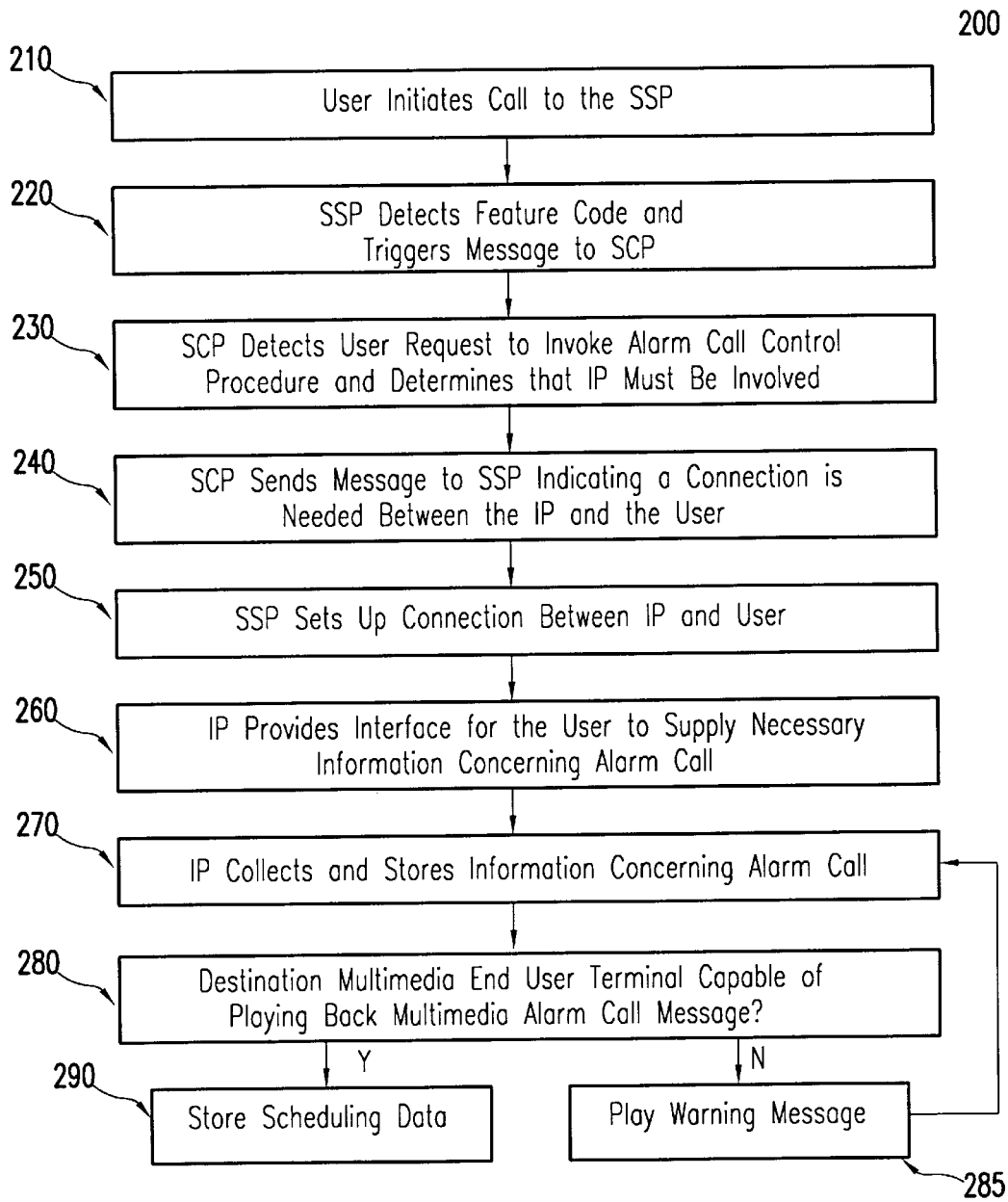
FIG. 2 is a flowchart of control procedures for scheduling an Alarm Call according to one or more aspects of the present invention.

FIG. 2 is a flowchart 200 of control procedures for scheduling an alarm call according to one or more aspects of the present invention. In a first step 210, a user initiates a call to the Service Switching Point 140, requesting a feature. In a system according to this invention in the present example, the user requests an Alarm Call message feature.

In a next step 220, the Service Switching Point 140 detects the feature request and triggers a message to the Service Control Point 150. In a next step 230, the Service Control Point 150 determines from the message that a user has performed an Alarm Call request and desires to invoke an Alarm Call control procedure for scheduling an Alarm Call message. In a preferred embodiment, the Service Control Point 150 determines that an Intelligent Peripheral 160 must be involved to accomplish the desired procedure.

In a next step 240, the Service Control Point 150 sends a message to the Service Switching Point 140 indicating that a connection is needed between the user and an Intelligent Peripheral 160. Then, in a step 250, the Service Switching Point 140 sets up a connection between the Intelligent Peripheral 160 and the user.

In a step 260, the Intelligent Peripheral 160 provides a message control interface for the user to supply necessary delivery information for scheduling the Alarm Call. The information will include, at a minimum, the multimedia message to be delivered in addition to a delivery schedule for the message. The message control interface is designed to match the type of multimedia end user terminal which is scheduling the Alarm. For example, the multimedia end user terminal may typically include a display screen and an input device such as a keyboard and a mouse. Then the message control interface, is a multimedia interface allowing a user to schedule delivery of an Alarm Call message through interaction with a series of display screens presented to the multimedia end user terminal 110 by the Intelligent Peripheral 160.

The message control interface provides the user with multimedia control procedures for scheduling delivery of the Alarm Call message. In a preferred embodiment, the Intelligent Peripheral 160 allows the user to select a multimedia Alarm Call message from a set of predefined multimedia messages which are already stored therein. The message control interface may allow the user to select and preview one of the predefined messages for playback at the multimedia end user terminal 110.

In one embodiment, the interface also provides the user with an option for recording or downloading a message to be stored at the Intelligent Peripheral 160 for later playback. The message may be in any format which can be played or displayed by the destination multimedia end user terminal 110 where the Alarm Call message is to be delivered.

In a preferred embodiment, an Alarm Call message may comprise a multimedia message which is played over the multimedia end user terminal 110. Besides simple audible tones or rings, exemplary messages include but are not limited to: audio messages, such as music or voice clips; audiovisual messages, such as prerecorded video clips that may include full motion video, still images, audio or a combination of such media; and data signals, such as an instruction for the multimedia end user terminal 110 to play a locally stored multimedia message or to perform a function such as waking up or turning on an external peripheral.

In a preferred embodiment, a user may schedule a "casual" Alarm Call, covering only the 24 hour period immediately following the time when the Alarm Call is scheduled, or a "regular" Alarm Call, covering a number of 24 hour periods. A regular Alarm Call message may be delivered according to a variety of different delivery schedules, for example: every day at the same time, for a specified number of consecutive days; every day at the same time, on specified days of the calendar week for a specified number of consecutive weeks; or every day at two or more different times for a specified number of consecutive days.

Optionally, a user may schedule at a first (originating) multimedia end user terminal delivery of an Alarm Call message to a second (destination) multimedia end user terminal. For example, a supervisor may schedule at his/her own multimedia end user terminal a multimedia birthday greeting for an employee that would be delivered on the employee's birthday at the employee's multimedia end user terminal.

In a step 270, the Intelligent Peripheral 160 collects and the delivery information pertaining to the Alarm Call message, including, at a minimum, the message to be delivered and the delivery schedule for the message, and optionally, a number for a multimedia end user terminal 110 to which the Alarm Call is to be delivered. As described above, the delivery schedule may include one or more delivery times when the Alarm Call message is to be delivered (e.g., at 9:00 am on each Monday through Friday for the next year).

When the multimedia Alarm Call is scheduled for delivery to a different (destination) multimedia end user terminal than the (originating) multimedia end user terminal from which it was scheduled, it may be the case that the message cannot be played back properly. For example, the multimedia Alarm Call message may include video data, but the destination multimedia end user terminal 110 may not have video display capability. Accordingly, in a preferred embodiment, Alarm Call delivery system 100 performs a check to insure that the message can be played back properly on the intended destination multimedia end user terminal. This check may be performed during the process of scheduling the Alarm Call, or just before the Alarm Call is delivered.

In a first preferred embodiment, this check is performed while scheduling an Alarm Call. In that case, in a step 280, the Service Control Point 150 communicates a multimedia capability request to a Service Switching Point 140 associated with a destination multimedia end user terminal 110 to determine whether the destination multimedia end user terminal 110 is capable of receiving and playing such multimedia data. In response, the Service Switching Point 140 determines the multimedia playback capabilities of the destination multimedia end user terminal 110 and sends a multimedia capability report to the Service Control Point 150. In a preferred embodiment, a connectionless signal such as an application layer message may be sent over an SS7 signal link to perform the compatibility check. If the Service Control Point 150 determines that the destination multimedia end user terminal is not capable of playing back the message, then, in a step 285, the network provider equipment system 130 delivers an appropriate warning or message to the originating multimedia end user terminal where in the call is being scheduled. In that case, the user is asked to select or create a different message type capable of playback on the destination multimedia end user terminal.

In a preferred embodiment, the network provider equipment system 130 stores the Alarm Call schedule and destination terminal information at the Service Control Point 150, and stores the multimedia message data for the Alarm Call at the Intelligent Peripheral 160. Preferably, a common identification number is assigned to both the scheduling data and the associated multimedia message data for correlating the data for delivery of the Alarm Call.

In that case, in a step 290, the Intelligent Peripheral 160 transmits the received scheduling data and destination terminal number, along with the assigned identification number, to the Service Control Point 150 for later activation. The Service Control Point 150 then stores the received data and identification number within its subscriber records, while the Intelligent Peripheral 160 stores the multimedia message data.

In another embodiment, the Intelligent Peripheral 160 may store the scheduling data together with the multimedia message data for the Alarm Call.

Figure 3:
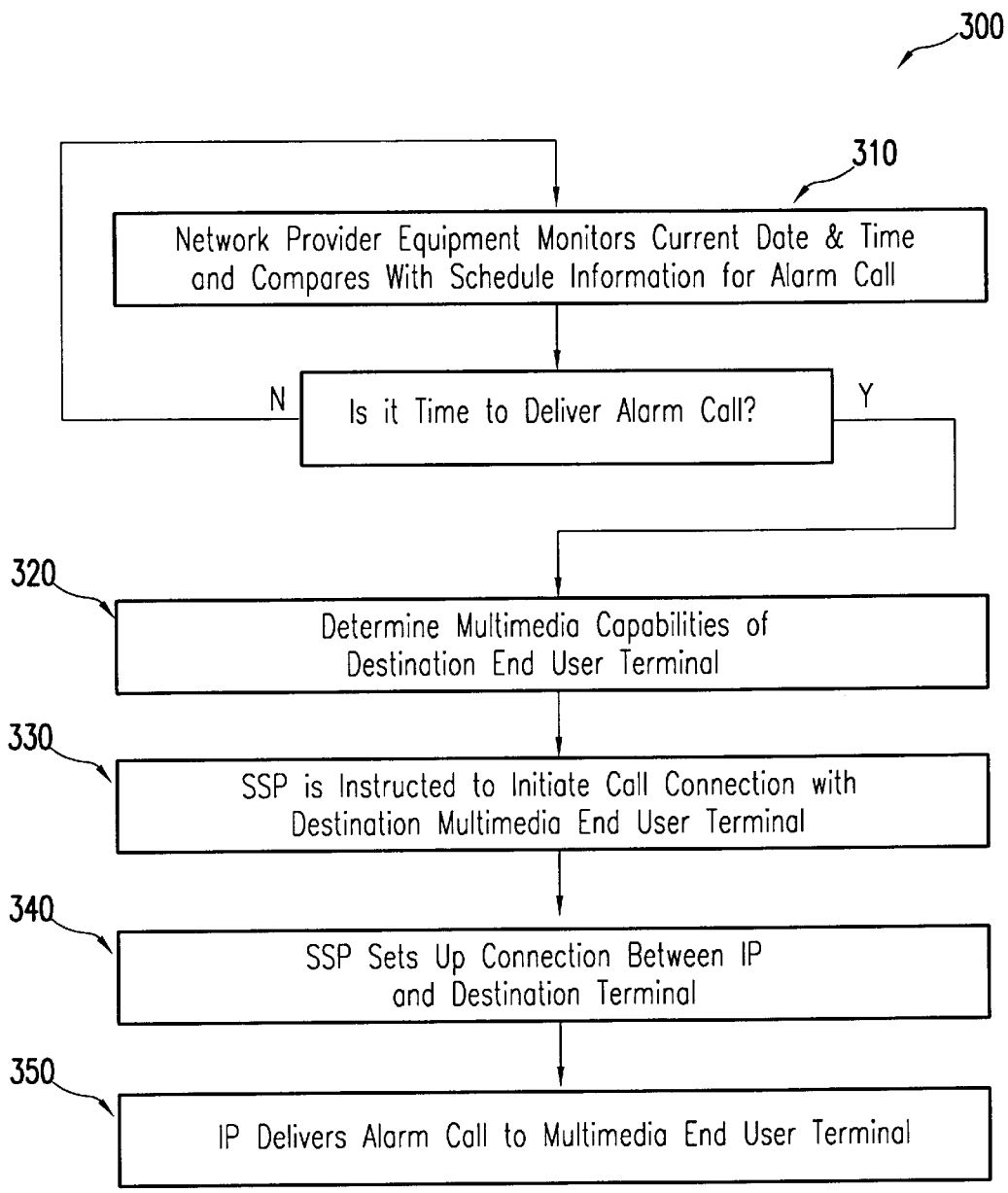
FIG. 3 is a flowchart of control procedures for delivering a prescheduled Alarm Call according to one or more aspects of the present invention.

FIG. 3 is a flowchart 300 of control procedures for delivering the prescheduled Alarm Call message, scheduled according to the process described with respect to FIG. 2, according to one or more aspects of the present invention.

In a first step 310, the network provider equipment system 130 monitors the current date and time and compares this with schedule information for the Alarm Call.

In a preferred embodiment, the Service Control Point 150 stores the schedule information which is provided to it by the Intelligent Peripheral 160. Preferably, the schedule information is provided by the Intelligent Peripheral 160 to the Service Control Point 150 at the time when the Alarm Call is scheduled. In that case, the Service Control Point 150 monitors the current date and time and compares this with schedule information for the Alarm Call.

In a second embodiment, the Intelligent Peripheral 160 stores the scheduling information, monitors the current date and time and compares this with schedule information for the Alarm Call.

As discussed above, when the multimedia Alarm Call is scheduled for delivery to a different (destination) multimedia end user terminal than the (originating) multimedia end user terminal from which it was scheduled, it may be the case that the message cannot be played back properly. This check may be performed during the process of scheduling the Alarm Call, as described above in a step 280.

However, in a second preferred embodiment, the check is performed just before the Alarm Call is delivered. In that case, in a step 320, the Service Control Point 150 communicates with a Service Switching Point 140 associated with a destination multimedia end user terminal 110 to determine what types of multimedia data the destination multimedia end user terminal 110 is capable of receiving and playing. Upon a determination of the capabilities of the destination multimedia end user terminal 110, the Service Control Point 150 instructs the Intelligent Peripheral 160 to only communicate those data portions from said multimedia Alarm Call message which are compatible with the destination multimedia end user terminal 110. However it is important to note that in this case, when storing the multimedia data, the Intelligent Peripheral 160 must segregate the data into multimedia types (e.g., video, audio, etc.) so that those data portions from said multimedia Alarm Call message which are compatible with the destination multimedia end user terminal can be communicated separately.

In a step 330, when the network provider equipment system 130 determines that the scheduled time has arrived for delivering the Alarm Call, a call set-up signal, such as an Integrated Service User Part (ISUP) Initial Address Message (IAM), is sent to the Service Switching Point 140 to initiate a call connection with the destination multimedia end user terminal 110.

In a preferred embodiment, the Service Control Point 150 stores the schedule information for the Alarm Call. In that case, when the Service Control Point 150 determines that the scheduled time has arrived for delivering the Alarm Call, it sends the message to the Service Switching Point 140 to set-up a call connection with the destination multimedia end user terminal 110. The Service Control Point 150 further instructs the Service Switching Point 140 to link to the Intelligent Peripheral 160 wherein the multimedia message data is stored.

In another embodiment, the Intelligent Peripheral 160 stores the schedule information for the Alarm Call. In that case, when the Intelligent Peripheral 160 determines that the scheduled time has arrived for delivering the Alarm Call, it instructs the Service Control Point 150 to set-up a call connection with the destination multimedia end user terminal 110. The Service Control Point 150 in turn sends a message instructing the Service Switching Point 140 to initiate a call connection with the destination multimedia end user terminal 110, and to link to the Intelligent Peripheral 160 wherein the multimedia message data is stored.

Next, in a step 340, the Service Switching Point 140 establishes a connection with the multimedia end user terminal 110 over the multimedia bearer connection 120.

Finally, in a step 350, once the connection is made, the Intelligent Peripheral 160 delivers the previously stored multimedia Alarm Call message to the multimedia end user terminal 110 over the multimedia bearer connection 120. In the preferred embodiment, the multimedia Alarm Call message is delivered in "real time" over a broadband bearer connection 120 which has sufficient bandwidth to support real time multimedia message delivery.

Occasionally, it may be that the message cannot be delivered at the scheduled delivery time. For example, the Service Switching Point 140 may not be able to establish a connection with the multimedia end user terminal 110 at the scheduled delivery time. In that case, the network provider equipment system 130 may wait a period of time and attempt again to deliver the multimedia Alarm Call message. This may be repeated a number of times before delivery is canceled. The number of attempts may be a system default or user-selectable as part of the delivery information provided by the user to the Intelligent Peripheral.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of scheduling a multimedia alarm call message for delivery from a network provider equipment system to a telephony user, comprising:

initiating a call from an originating multimedia end user terminal to a first connected switch in the network provider equipment system said call including an alarm call request to schedule delivery of said multimedia alarm call message;

receiving said call at the first connected switch and detecting said alarm call request to schedule delivery of said multimedia alarm call message;

sending a first signal from the first connected switch to a centralized database in response to said alarm call request to schedule delivery of said multimedia alarm call message;

sending a second signal from the centralized database to a recording device indicating the alarm call request to schedule delivery of said multimedia alarm call message;

establishing a connection between said originating multimedia end user terminal and the recording device;

providing an interface from the recording device to said originating multimedia end user terminal for scheduling delivery of said multimedia alarm call message;

communicating from the originating multimedia end user terminal to the recording device a delivery schedule for said multimedia alarm call message;

storing said delivery schedule;

storing at the centralized database a destination number for a destination multimedia end user terminal where said multimedia alarm call message is to be delivered;

determining whether said destination multimedia end user terminal is capable of receiving and playing said multimedia alarm call message; and providing a warning message to said originating multimedia end user terminal when said destination multimedia end user terminal is incapable of receiving and playing said multimedia alarm call message.

2. The method of claim 1, further comprising, in response to a selection at said originating multimedia end user terminal, storing at the recording device one of a plurality of predefined multimedia messages as said multimedia alarm call message.

3. The method of claim 1, wherein the first connected switch is a service switching point, the centralized database is a service control point, and the recording device is an intelligent peripheral in an intelligent network.

4. The method of claim 1, wherein said multimedia alarm call message includes an instruction to be executed by a destination multimedia end user terminal to which said multimedia alarm call message is to be delivered.

5. The method of claim 1, wherein said delivery schedule is stored at said recording device.

6. The method of claim 1, further comprising: transmitting said delivery schedule from the recording device to said centralized database; and storing said delivery schedule at said centralized database.

7. The method of claim 1, wherein determining whether said destination multimedia end user terminal is capable of receiving and playing said multimedia alarm call message, further comprises:

sending a multimedia capability inquiry from the centralized database to a connected switch associated with said destination multimedia end user terminal, requesting a multimedia playback capability of said destination multimedia end user terminal;

receiving said capability inquiry message at the connected switch;

determining said multimedia playback capability of said destination multimedia end user terminal at said connected switch; and sending a multimedia capability report from said connected switch to said centralized database.

8. The method of claim 7, wherein the first connected switch is the connected switch associated with said destination multimedia end user terminal.

9. The method of claim 1, wherein said multimedia alarm call message comprises at least two selected from a group consisting of textual information, audio information, and graphical information.

10. The method of claim 1, wherein said multimedia schedule includes:

a scheduled delivery time when said multimedia alarm call message is to be delivered; and a destination number for a destination multimedia end user terminal where said multimedia alarm call message is to be delivered.

11. The method of claim 10, wherein said the originating multimedia end user terminal is the destination multimedia end user terminal.

12. A method of delivering a previously scheduled multimedia alarm call message from a network provider equipment system to a telephony user, comprising:

storing at the centralized database a destination number for a destination multimedia end user terminal where said multimedia alarm call message is to be delivered;

determining whether said destination multimedia end user terminal is capable of receiving and playing said multimedia alarm call message; and providing a warning message to said originating multimedia end user terminal when said destination multimedia end user terminal is incapable of receiving and playing said multimedia alarm call message;

monitoring a current time in the network provider equipment system;

comparing said current time with a scheduled delivery time for said previously scheduled multimedia alarm call message;

in response to a coincidence between said current time and said scheduled delivery time, sending an instruction from a centralized database to a connected switch in said network provider equipment system to initiate a connection between said destination multimedia end user terminal and a recording device wherein said multimedia alarm call message is stored;

establishing a connection between said destination multimedia end user terminal and said recording device; and delivering said previously scheduled multimedia alarm call message from said recording device to said destination multimedia end user terminal.

13. The method of claim 12, wherein said multimedia alarm call message is an audiovisual message.

14. The method of claim 12, wherein said multimedia alarm call message comprises a data message.

15. The method of claim 14, wherein said data message includes an instruction to be executed by said multimedia end user terminal.

16. The method of claim 12, wherein said scheduled delivery time is stored at said recording device.

17. The method of claim 12, wherein said scheduled delivery time is stored at said centralized database.

18. The method of claim 12, where said destination multimedia end user terminal is different from an origination multimedia end user terminal at which delivery of said previously scheduled multimedia alarm call message was scheduled.

19. The method of claim 18, further comprising:

determining data types which said destination multimedia end user terminal is capable of receiving and playing; and delivering from said recording device to said destination multimedia end user terminal only portions of said previously scheduled multimedia alarm call message matching said data types.

20. A system for delivering a multimedia alarm call message to a telephony user, comprising:

a connected switch for receiving a request from an originating multimedia end user terminal to schedule delivery of said multimedia alarm call message;

a recording device connected to said connected switch for providing an interface to the originating multimedia end user terminal to schedule delivery of said multimedia alarm call message in response to said request to schedule delivery of said multimedia alarm call message and for receiving from the originating multimedia end user terminal delivery information for said multimedia alarm call message, including a scheduled delivery time for said multimedia alarm call message;

a destination end user terminal, connected to said connected switch, where said multimedia alarm call message is to be delivered;

a centralized database connected with said recording device and said connected switch for instructing said connected switch to initiate a connection between said recording device and said destination multimedia end user terminal to deliver said multimedia alarm call message in response to a coincidence between a current time and said scheduled delivery time;

means for determining whether said destination multimedia end user terminal is capable of receiving and playing said multimedia alarm call message; and means for providing a warning message to said originating multimedia end user terminal when said destination multimedia end user terminal is incapable of receiving and playing said multimedia alarm call message.

21. The system of claim 20, wherein said destination multimedia end user terminal is connected with said connected switch though a broadband bearer connection.

22. The system of claim 21, wherein said broadband bearer connection is one selected of a group consisting of an ISDN connection, B-ISDN, frame relay, an ADSL connection, and a cable modem.

23. The system of claim 20, wherein said destination multimedia end user terminal includes a video display.

24. The system of claim 20, wherein said originating multimedia end user terminal is the destination multimedia end user terminal.

25. The system of claim 20, wherein said destination multimedia end user terminal is not the originating multimedia end user terminal.

26. In a telephony system, a method of scheduling a multimedia alarm call message, comprising:

establishing a connection between an originating multimedia end user terminal and network provider equipment in said telephony system;

placing an alarm call request from said originating multimedia end user terminal to said network provider equipment to schedule said multimedia alarm call message;

providing from the network provider equipment to the originating multimedia end user terminal an interface for execution of multimedia control procedures by a user to provide delivery information for said multimedia alarm call message;

providing from the originating multimedia end user terminal to the network provider equipment said delivery information;

storing said delivery information at said network provider equipment determining whether a destination multimedia end user terminal, where said multimedia alarm call message is to be delivered, is capable of receiving and playing said multimedia alarm call message; and providing a warning message to said originating multimedia end user terminal when said destination multimedia end user terminal is incapable of receiving and playing said multimedia alarm call message.

* * * * *